United States Patent [19]

Starmer

[11] Patent Number: 4,545,246

[45] Date of Patent: Oct. 8, 1985

[54] TIRE PRESSURE INDICATING DEVICE

[75] Inventor: John E. Starmer, Colegate, England

[73] Assignee: Metro Products (Accessories & Leisure) Limited, Oxted, England

[21] Appl. No.: 532,033

[22] PCT Filed: Dec. 14, 1981

[86] PCT No.: PCT/GB81/00269

§ 371 Date: Aug. 12, 1983

§ 102(e) Date: Aug. 12, 1983

[87] PCT Pub. No.: WO83/02091

PCT Pub. Date: Jun. 23, 1983

[51] Int. Cl.$^4$ .................................................. G09F 9/00
[52] U.S. Cl. ................................... 116/315; 116/34 R
[58] Field of Search ..................... 73/146.8; 116/34 R, 116/315, 312, 311, 309

[56] References Cited

U.S. PATENT DOCUMENTS

| | | | |
|---|---|---|---|
| 919,658 | 4/1909 | Washburn | 116/34 R |
| 960,246 | 6/1910 | Ashmore | 73/146.8 |
| 1,296,160 | 3/1919 | Butterfield | 116/34 R |
| 1,467,317 | 9/1923 | Harris | 116/34 R |
| 1,548,901 | 8/1925 | Payzant | 116/34 R |
| 3,177,724 | 4/1965 | Trinca | 73/431 |
| 3,889,530 | 6/1974 | Bluem | 73/146.8 |

FOREIGN PATENT DOCUMENTS

| | | |
|---|---|---|
| 881160 | 6/1953 | Fed. Rep. of Germany . |
| 2268209 | 11/1975 | France . |
| 1511831 | 5/1978 | United Kingdom . |

Primary Examiner—Donald O. Woodiel
Attorney, Agent, or Firm—Dennison, Meserole, Pollack & Scheiner

[57] ABSTRACT

A vehicle tire valve cap is disclosed incorporating a tire pressure indicator which can be set to indicate a pressure appropriate to given circumstances. The cap comprises two components (1,2). The top component (2) snap-fastens into the body component (1) and can then be turned into any selected index position. The top component bears on its top face a digit (15) and adjacent that digit the top components has a sectoral cut-out (10) through which any one of a plurality of digits (7) on the body component (1) can be exposed by turning the top component into the appropriate position. The two digits thus displayed indicate the selected tire pressure value.

5 Claims, 2 Drawing Figures

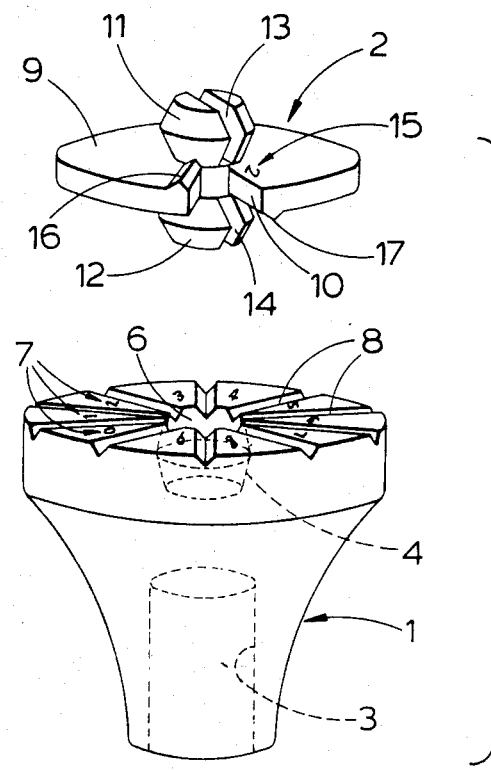
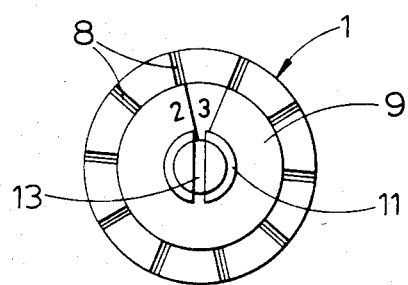
Fig.1
Fig.2

TIRE PRESSURE INDICATING DEVICE

This invention relates to a vehicle tire valve cap with tire pressure indicating means.

It is important for safety and other reasons that pneumatic tires of vehicles be inflated to correct pressures. However the correct pressures of the tires of any given vehicle are often not known or present to the mind of the vehicle owner or other person wishing to check or inflate the tires. In order to avoid this circumstance it has been proposed to display a number representing the correct tire pressure on each vehicle wheel or on a disc carried by the tire valve dust cap.

The foregoing proposals do not provide or do not conveniently provide for variation of the indicated pressure. It is an object of the present invention to provide a device which affords an advantage in this respect.

According to the present invention there is provided a tire cap bearing numerals for visually indicating a tire pressure value, characterised in that the cap incorporates relatively displaceable components forming cooperating parts of a tire pressure selection indicator bearing numerals for indicating various tire pressure values, which recorder by relative displacement of said components can be set to indicate any selected one of such values.

The invention affords significant advantages. Identical caps according to the invention can be fitted to tires requiring different inflation pressures, the caps being individually set to display the correct pressure. This is of particular advantage for example to merchants supplying and fitting replacement tires of a range of different specifications for a variety of vehicles. Caps according to the invention can also of course be marketed separately as an accessory suitable for various user requirements. A user can at any time easily alter the indicated pressure if required, e.g. when fitting the cap to the valve of a different tire or when a given tire is inflated to an above-normal pressure suitable for prolonged high speed travel.

The cap is preferably provided with a female screw profile enabling it to be screwed onto a standard tire valve body in the same way as a conventional dust cap. But the cap can as an alternative be formed for connection to a tire valve body in some other manner.

One component of the cap can for example be a slide component which is linearly slidable relative to the other component either to bring a marker on the slide into register with one of a number of different pressure values displayed on the other component, or to unmask a said displayed value.

An indicator working on a linear slide principle as just described cannot however display many different pressure values while keeping the cap to reasonably small dimensions. In more favoured embodiments of the invention, the indicator comprises numerals distributed around an axis of the cap and the relative angular position of said components about such axis is variable for varying the setting of the indicator. The numerals may for example be displayed at the top of the cap. A said rotary arrangement enables more pressure values to be included in a cap of given dimensions. Preferably the said components can be relatively rotated about said axis while they remain connected together.

The cap components can be relatively displaceable against a frictional resistance sufficient to prevent inadvertent relative displacement thereof, e.g. under the action of vibration. However it is preferred for at least part of one or each component to be elastically deformable and for the components to be shaped with portions which, as the components are brought into any of their relative positions corresponding with the different indicator settings, automatically interlock under elastic recovery forces to prevent such inadvertent displacement.

It is very suitable for the said cap components to have portions formed for snap-fastening one into the other for coupling the components together. For example one component may comprise an axial boss which is elastically deformable for snap-fitting into an undercut recess or bore of the other component.

Preferably the components or one of them is made of synthetic polymeric material. By way of example the components can be separated parts of a moulding in which such parts are connected by an easily breakable or severable connecting portion. A very suitable material for such moulding is polypropylene.

The indicator may comprise, for example, a series of pressure values distributed around one of the components, and an arrow, cursor or other marker on the other component. Alternatively such other component can have a cut-out or window through which any of said values can be exposed.

A very important feature of preferred embodiments of the invention is the allocation of digits to the relatively displaceable components so that any one of various plural-digit pressure values can be indicated by bringing the cap components into a relative position in which the selected value is represented by a combination of digits on different components.

The foregoing important feature enables an appreciable range of pressure values to be encompassed in a cap of modest dimensions, particularly if the indicator works on a dial principle, i.e. by relative rotation of the two components. In the interest of versatility it is preferable for the tire pressure selection indicator to cover a range of at least six different pressure values, and most preferably a range of ten or more such values. For example one of said components can bear the digit 2 representing tens and the other component can bear digits 0 to 9 representing units so that by relatively displacing the components they can be relatively positioned to represent any of the values 20 to 29. A very convenient arrangement is to provide one of the cap components with a digit or digits adjacent an opening or window through which any selected digit or combination of digits on the other component can be exposed. For example a digit representing tens, units or fraction units (e.g. tenths) can be located adjacent the opening or window, so that it can be positioned for reading in combination with a selected digit of different unit value on the other component.

An even wider range of pressure values can be encompassed by making the cap so that one component can be releasably coupled to the other component in either of two mutually inverse orientations in each of which said one component can be displaced relative to such other component and by providing different digits on opposite faces of said one component. This is a feature of optimum embodiments of the invention. For example if the said one component bears the tens digits 2 and 3 on its opposite faces and the other component bears the units digits 0 to 9 then the indicator can be set to indicate any of the values 20 to 29 or any of the values 30 to 39, depending on which face of the said one component is exposed to view. In a modification of that example, units and tenths digits can be represented instead of tens and units.

By allocating digits of different unit value to different components as above referred to a series of pressure values covering a range wide enough to suit any standard private or any commercial vehicle can be provided on a dust cap of very modest dimensions, e.g. a cap having a diameter of about 14 mm.

A cap having a pressure indicator covering a range of pressures from 20 to 39 lbs/in$^{-2}$ indicated as such or in other pressure units, e.g. bars, or atoms, is suitable for use with almost all tires for currently marketed private automobiles. For commercial vehicle tires, pressures ranging from about 30 to about 95 lbs/in$^{-2}$ (in increments of 5 units), are generally used. A cap according to the present invention can incorporate a pressure indicator covering such a range. For example for indicating pressures in lbs/in$^{-2}$ one component can bear the units digits 0 and 5 either of which can be brought into association with any of the tens digits 3 to 9, the latter being provided on the other component. For indicating pressure in bars, the indicator may for example provide for pressure selections ranging, in increments of 0.1 bars, from 1 to 1.9 bars or from 2.0 to 2.9 bars. Or a pressure selection ranging, in increments of 0.5, from 0 to 9.5 bars can be provided for by placing the tenths digits 0 and 5 on one component for bringing either of such digits into association with the units digits 0 to 9 on the other component.

An embodiment of the invention, selected by way of example, will now be described with reference to the accompanying drawings in which FIG. 1 is an exploded perspective view on an enlarged scale of the components of a tire valve dust cap according to the invention and FIG. 2 is plan view of the assembled cap components in a particular setting.

The illustrated cap comprises a body component 1 and a top component 2, injection moulded from polypropylene.

The component 1 has a socket 3 in which a thread can be formed by screwing the component onto a conventional pneumatic tire valve. In the top portion of the said body component there is an axial recess 4 shaped to provide adjacent its entrance an undercut face 6. A series of digits 7 (in this instance digits 0 to 9) is engraved or moulded in the top face of the component 1, these digits being distributed around the recess 4. The top face of said component is shaped to provide a radial triangular-section groove such as 8 between each neighbouring pair of said digits.

The top component 2 comprises a disc portion 9 with a sectoral opening 10 and integral axial bosses 11 and 12 projecting from opposite faces of the disc. Each boss comprises two opposed portions separated by a diametral slot 13 or 14. On one side of the disc portion 9 there is a digit 15 (in this instance digit 2) adjacent one boundary of said opening 10 and an integral triangular section rib 16 adjacent the opposite boundary of such opening. The other side of the disc bears another digit (digit 3) and a rib 17 adjacent opposite boundaries of the said opening.

The components can be assembled by push-fitting the boss 12 into the recess 4 in the body component. When the top component is angularly positioned so that one of the digits 7 on the body component is exposed centrally through the opening 10 in the top component, the rib 17 occupies one of the radial grooves such as 8 in the top face of the body component. In such a position the top of the cap displays a two-digit number comprising the tens digit (in this instance digit 2) on the top component and the units digit which is exposed through said opening. FIG. 2 shows the indicator set so that units digit 3 is exposed through said opening and the indicator therefore displays the value 23. The top component 2 can by applying sufficient turning moment to cause the rib to ride out of the groove, be turned relatively to the body component 1 into a different setting in which any of the other units digits on the body component is exposed through the opening. Consequently the top component can be set so that the cap displays any of the values 20 to 29. The boss 12 remains captive in the recess 4 during such rotations of the top component. The necessary force for turning the top component relative to the body component can be applied to the top boss 11 by means of a coin inserted in the slot 13.

It it is desired to set the recorder to indicate any of the numbers 30 to 39 the top component 2 is pulled out of the recess 4 in the body component 1 and reinserted in inverted orientation, i.e. so that the boss 11 enters the recess 4 and the tens digit 3 on the top component is displayed to view. The top component can then, as before, be turned to expose any of the units digits through the opening 10.

A cap according to the invention can be designed for displaying values represented by more than two digits. For example the top component 2 of a cap of the same basic construction as the one illustrated can have, on at least one of its faces, a digit adjacent each of the opposed boundaries of its opening 10 for reading in combination with a digit displayed through that opening. For example one face of the top component may bear two digits representing tens and tenths of a unit respectively while the digits on the other component represent units. If in such circumstances the opposite face of the top component bears a different tens and/or a different tenths digit a second series of three-digit values can be indicated when the top component is used in its inverted orientation. The successive values of such second series may for example differ by 0.5 units from the successive values of the first series.

The top component 2 of a cap as illustrated can be provided with a transparent window instead of the opening 10.

In another modification the grooves 8 and ribs 16,17 are replaced by recesses and dimples.

In another form of cap according to the invention a body component such as 1 bears pressure values or digits at angularly spaced positions along the peripheral margin of its top face and a top component such as 2 bears a marker or a digit near its periphery, which marker or digit by rotation of said top component can be brought into register with a selected pressure value or digit on the body component.

I claim:

1. A tire valve cap with tire pressure indicating means, said cap comprising a body component for connection to a pneumatic tire valve, said body component having a a series of digits thereon; a second component bearing a digit on each of two opposed faces thereof; and means whereby said second component can be releasably coupled to said body component in either of two mutually inverse orientations in which one or the other of said digit-bearing faces is exposed; said coupling means permitting said second component when coupled to said body component in either of those orientations to be displaced relative to said body component for bringing the exposed digit on said second component into reading combination with any selected one of said digits on said body component thereby to display a plural-digit pressure value.

2. A tire valve cap according to claim 1, wherein at least part of at least one of said body and second components is elastically deformable and said components are shaped to cause said part to become elastically deformed by displacement of said second component from one to another plural-digit display setting relative to said body component and to cause said components to interlock under elastic recovery forces on reaching a said display setting.

3. A tire valve cap with tire presure indicating means, said cap comprising a body component for connection to a pneumatic tire valve, said body component having a top face marked with a series of digits distributed around the axis of the cap; a top component having a disc portion overlying said top face of said body component; means for connecting said top component to said body component in either of two mutually inverse orientations while permiting said top component when so connected to be rotated about said axis, relative to said body component; and an opening in the disc portion of said top component through which opening any selected one of said digits on said body component can be displayed by rotating said top component into an appropriate position relative to said body component; said disc portion of said top component being itself marked adjacent said opening, with at least one digit on one face of such portion and with a different digit on the opposite face thereof, whereby any selected one of various plural-digit tire pressure values can be displayed by connecting said top component in one or the other of its mutually inverse orientations to said body component and rotating said cap component to bring at least one digit on the then tip face of the disc portion of such component into position for reading in combination with at least one digit exposed through said opening.

4. A tire valve cap accordinag to claim 3, wherein on each face of the disc portion of said top component there is a central axially projecting boss and said body portion has in the top thereof a central socket for receiving either of said bosses, said bosses and said socket being formed for snap-fastening one into the other.

5. A tire valve cap with tire presure indicating means, said cap comprising a body component for connection to a pneumatic tire valve, and a top component which is connected to the top of said body component and is rotatable relative thereto about the axis of the cap; said cap bearing a plurality of digits which are distributed around the axis of the cap and are allocated as between said body and top components thereby to permit any one of various plural-digit tire pressure values to be indicated by rotating said top component into a position relative to said body component in which the selected value is represented by a combination of digits on the different components.

* * * * *